United States Patent
Ouyang

(10) Patent No.: US 9,559,586 B2
(45) Date of Patent: Jan. 31, 2017

(54) SWITCH MODE POWER SUPPLY, CONTROL CIRCUIT AND ASSOCIATED CONTROL METHOD

(71) Applicant: Chengdu Monolithic Power Systems Co., Ltd., Chengdu (CN)

(72) Inventor: Qian Ouyang, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 213 days.

(21) Appl. No.: 14/038,716

(22) Filed: Sep. 26, 2013

(65) Prior Publication Data

US 2014/0084885 A1    Mar. 27, 2014

(30) Foreign Application Priority Data

Sep. 27, 2012 (CN) .......................... 2012 1 0374410

(51) Int. Cl.
*H02M 3/156* (2006.01)
*H02M 3/158* (2006.01)
*H02M 1/00* (2006.01)

(52) U.S. Cl.
CPC ..... *H02M 3/158* (2013.01); *H02M 2001/0032* (2013.01); *Y02B 70/16* (2013.01)

(58) Field of Classification Search
CPC ................. H02M 2001/0032; H02M 3/1563; H02M 2003/1566; H02M 3/1588; H02M 3/156; Y02B 70/16
See application file for complete search history.

(56) References Cited

U.S. PATENT DOCUMENTS

| 8,198,880 | B2 | 6/2012 | Ouyang | |
|---|---|---|---|---|
| 8,400,129 | B2 | 3/2013 | Ouyang | |
| 8,669,747 | B2* | 3/2014 | Fang | H02M 3/156 323/224 |
| 8,773,099 | B2* | 7/2014 | Granger | H02M 3/1588 323/284 |
| 2005/0111244 | A1* | 5/2005 | Tzeng | H02M 1/15 363/41 |
| 2008/0042709 | A1* | 2/2008 | Chen | H02M 3/156 327/175 |
| 2009/0153127 | A1* | 6/2009 | Chen | 323/350 |
| 2010/0033215 | A1* | 2/2010 | Fogg | H03K 4/50 327/137 |
| 2011/0109291 | A1* | 5/2011 | Tang et al. | 323/282 |
| 2012/0019219 | A1* | 1/2012 | Fang et al. | 323/271 |
| 2012/0019225 | A1* | 1/2012 | Tsai | H02M 3/156 323/284 |
| 2012/0235664 | A1 | 9/2012 | Dong | |
| 2013/0002223 | A1 | 1/2013 | Xi | |

* cited by examiner

*Primary Examiner* — Harry Behm

(57) ABSTRACT

A switch mode power supply having an output terminal configured to provide an output voltage, the switch mode power supply has a first switch and a control circuit. The control circuit is configured to provide a switching control signal to turn ON and turn OFF the first switch, an on-time period of the first switch is proportional to a first value when the switch mode power supply works in a power saving mode, and the on-time period of the first switch is proportional to a second value when the switch mode power supply works in a normal mode, wherein the first value is larger than the second value.

19 Claims, 6 Drawing Sheets

SWITCH MODE POWER SUPPLY, CONTROL CIRCUIT AND ASSOCIATED CONTROL METHOD

CROSS-REFERENCE TO RELATED APPLICATION(S)

This application claims the benefit of CN application No. 201210374410.3, filed on Sep. 27, 2012, and incorporated herein by reference.

TECHNICAL HELD

The present invention relates to electrical circuit, more particularly but not exclusively relates to switch mode power supply.

BACKGROUND

With development of electronic technology, many electronic devices such as mobile phone, personal digital assistant (PDA), tablet PC, netbook and ultrabook are widely used. While many electronic devices have to support AOAC (always on and always connected) mode, i.e., standby mode, in which an electronic device is active but draws lithe current. The standby time period, in another word, how long the electronic device can stay in AOAC mode is critical. As load only draws little current in AOAC mode, overall efficiency at light load is of vital importance.

Constant on-time controlled switch mode power supply is widely used in electronic devices for power conversion due to their excellent load transient response, simple internal configuration and smooth operation mode switching. An on-time period of a switch mode power supply is provided based on an input voltage VIN and an output voltage VO with traditional constant on-time control independent of load condition. Higher switching frequency Fsw is needed for faster load transient response, smaller size and weight. Take a step-down converter with 10V input voltage VIN, 1V output voltage VO and 1 MHz switching frequency Fsw as one example, on-time period TON is 100 ns within full load range, but driving loss and switching loss are dominant at light load and power loss of the step-down converter would increase with switching frequency at light load, which is not good for improvement of efficiency.

SUMMARY

It is one of the objects of the present invention to provide switch mode power supply, control circuit and associated control method to resolve one or more technical problems.

One embodiment of the present invention discloses a control circuit for a switch mode power supply, the switch mode power supply comprises a first switch, wherein the control circuit is configured to turn ON and/or turn OFF the first switch, and wherein the control circuit comprises: a first comparison circuit, having a non-inverting terminal, an inverting terminal and an output terminal, wherein the non-inverting terminal of the first comparison circuit is configured to receive a reference voltage, the inverting terminal of the first comparison circuit is configured to receive a feedback signal indicating an output voltage of the switch mode power supply, and the output terminal of the first comparison circuit is configured to provide a setting signal; an on-time control circuit, configured to provide an on-time control signal based on an input voltage of the switch mode power supply, the output voltage of the switch mode power supply and a mode control signal, wherein an on-time period of the first switch controlled by the on-time control signal is configured to decrease with the input voltage of the switch mode power supply and increase with the output voltage of the switch mode power supply; and a logic circuit, configured to receive the setting signal and the on-time control signal and configured to provide a switching control signal to turn ON and/or turn OFF the first switch; wherein when the mode control signal is in a first state, the switch mode power supply is configured to transit to a power saving mode, and the on-time period of the first switch increases; and wherein when the mode control signal is in a second state, the switch mode power supply is configured to transit to a normal mode.

Another embodiment of the present invention discloses a switch mode power supply, wherein the switch mode power supply may comprise a first switch and the control circuit described above.

Yet another embodiment of the present invention discloses a control method for a switch mode power supply, the switch mode power supply comprises a first switch and a control circuit for turning ON and/or turning OFF the first switch, wherein the control method comprises: providing a feedback signal based on an output voltage of the switch mode power supply; providing a setting signal via comparing the feedback signal with a reference voltage; turning on the first switch based on the setting signal; providing an on-time control signal to control an on-time period of the first switch based on a mode control signal, wherein the on-time period of the first switch is proportional to a first value when the mode control signal is in a first state, the on-time period of the first switch is proportional to a second value when the mode control signal is in a second state, wherein the first value is larger than the second value; and turning OFF the first switch based on the on-time control signal.

With embodiments of the present invention, it is flexible to achieve fast transient response and high efficiency at light load with high switching frequency.

BRIEF DESCRIPTION OF THE DRAWINGS

Non-limiting and non-exhaustive embodiments are described with reference to the following drawings.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to switch mode power supply, control circuit and associated control method. As used hereinafter, the term "couple" generally refers to multiple ways including a direct connection with an electrical conductor and an indirect connection through intermediate diodes, resistors, capacitors, and/or other intermediaries.

Figure 1:
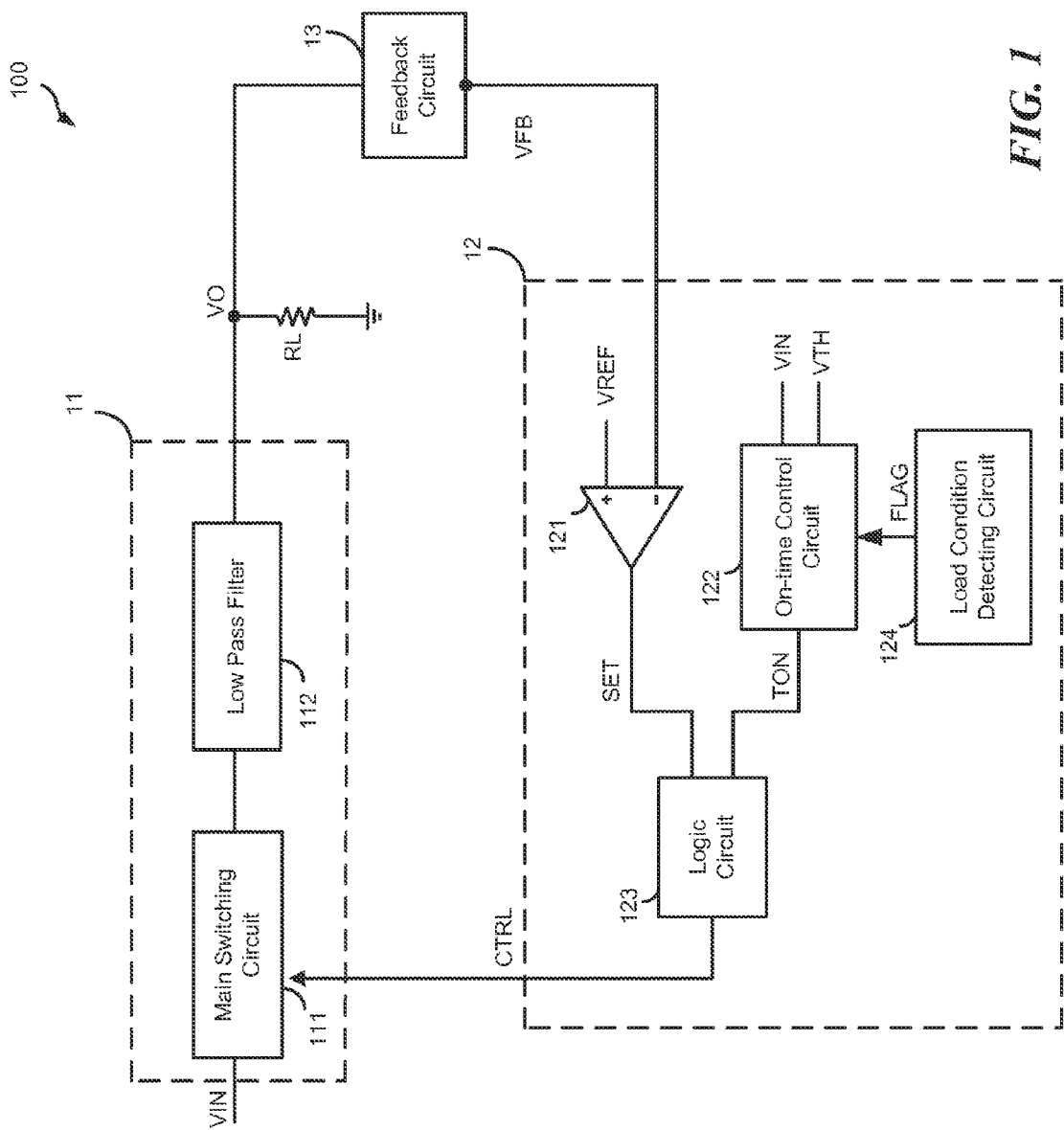
FIG. 1 illustrates a circuit block diagram of a switch mode power supply 100 according to an embodiment of the present invention.

FIG. 1 illustrates a circuit block diagram of a switch mode power supply 100 according to an embodiment of the present invention. Switch mode power supply 100 comprises a power stage 11, a control circuit 12 and a feedback circuit 13.

Power stage 11 comprises a switching circuit 111 and a low pass filter 112, wherein switching circuit 111 comprises a first switch. In one embodiment, low pass filter 112 comprises an inductor and a capacitor. Switching circuit 111 is configured to receive an input voltage VIN, and is configured to provide an output voltage VO through low pass filter 112 via turning ON and/or turning OFF the first switch. A load RL is coupled between output voltage VO and a system ground. Power stage 11 may comprise a direct current to direct current (DC/DC) converter or an alternating current to direct current (AC/DC) converter. One of ordinary skill in the art should understand that any suitable topology may be employed, such as step-down converter, step-up converter, half-bridge converter and so on.

Control circuit 12 comprises a comparison circuit 121, an on-time control circuit 122 and a logic circuit 123. Control circuit 12 is configured to regulate output voltage VO via providing a switching control signal CTRL to turn ON and/or turn OFF the first switch. Control circuit 12 may be integrated on a chip or may comprise discrete devices. In one embodiment, control circuit 12 comprises both an integrated circuit and discrete devices. In one embodiment, control circuit 12 is implemented by an analog circuit. In another embodiment, control circuit 12 is implemented by a digital circuit, such as Micro Control Unit (MGU), Digital Signal Processor (DSP), Filed Programmable Gate Array (FPGA) and Application Specific Integrated Circuit (ASIC).

Comparison circuit 121 comprises a non-inverting terminal, an inverting terminal and an output terminal, wherein the non-inverting terminal of comparison circuit 121 is configured to receive a reference voltage VREF, the inverting terminal of comparison circuit 121 is configured to receive a feedback signal VFB which indicates output voltage VO, and the output terminal of comparison circuit 121 is configured to provide a setting signal SET via comparing feedback signal VFB with reference voltage VREF. When feedback signal VFB is less than reference voltage VREF, setting signal SET is effective, e.g., SET="1". When feedback signal VFB is larger than reference voltage VREF, setting signal SET is ineffective, e.g., SET="0".

On-time control circuit 122 is configured to receive input voltage VIN, a threshold signal VTH and a mode control signal FLAG, and is configured to provide an on-time control signal TON. In one embodiment, threshold signal VTH comprises output voltage VO. In another embodiment, threshold signal VTH comprises a constant voltage level. On-time control signal TON is configured to adjust an on-time period ton1 of the first switch. In one embodiment, on-time period ton1 of the first switch decreases with input voltage VIN and increases with output voltage VO. In one embodiment, on-time period ton1 of the first switch is determined by the following equation:

$$ton1 = K*VO/VIN \tag{1}$$

Where K is a coefficient adjusted by mode control signal FLAG.

Switch mode power supply 100 is configured to operate in a power saving mode or a normal mode based on mode control signal FLAG. When mode control signal FLAG is effective, switch mode power supply 100 works in the power saving mode, coefficient K equals to a constant value M; and when mode control signal FLAG is ineffective, switch mode power supply 100 works in the normal mode, coefficient K equals to a constant value N, wherein M>N.

In one embodiment, when mode control signal FLAG is effective, e.g., FLAG="1", coefficient K equals to constant value M, an on-time period ton1_standby of the first switch at the power saving mode is:

$$ton1\_standby = M*VO/VIN \tag{2}$$

In one embodiment, when mode control signal FLAG is ineffective, e.g., FLAG="0", coefficient K equals to constant value N, where M>N, for example, M=2N. an on-time period ton1_normal of the first switch at the normal node is:

$$ton1\_normal = N*VO/VIN \tag{3}$$

On-time period ton1_standby of the first switch at the power saving mode is larger than on-time period ton1_normal of the first switch at the normal mode per constant value M is larger than constant value N. As a result, a switching frequency of switch mode power supply 100 may be much higher to achieve fast load transient response at the normal mode per smaller on-time period ton1_normal of the first switch, and the switching frequency of switch mode power supply 100 may be much lower to achieve lower driving loss and switching loss and higher efficiency at the power saving mode per larger on-time period ton1_standby of the first switch.

In one embodiment, mode control signal FLAG is provided by a smart load, such as Central Processing Unit (CPU) and Micro Programmed Control Unit (MCU). Taking an ultrabook as one example, when working at light load, such as in AOAC mode or standby mode, CPU of the ultrabook sends out a command as mode control signal FLAG to switch mode power supply 100, and switch mode power supply 100 transits to the power saving mode accordingly. Mode control signal FLAG may be provided by switch mode power supply 100. In one embodiment, control circuit 12 further comprises a load condition detecting circuit 124. Load condition detecting circuit 124 is configured to provide mode control signal FLAG via detecting circuit parameters of switch mode power supply 100. In one embodiment, load condition detecting circuit 124 is configured to provide mode control signal FLAG via comparing an output current of switch mode power supply 100 with a current reference. When the output current of switch mode power supply 100 is less than the current reference, switch mode power supply 100 is recognized as working at light load, and mode control signal FLAG becomes effective to increase on-time period ton1 of the first switch, switch mode power supply 100 transits to the power saving mode. When the output current of switch mode power supply 100 is larger than the current reference, switch mode power supply 100 is recognized as working at non-light load, and mode control signal FLAG becomes ineffective to decrease on-time period ton1 of the first switch, switch mode power supply 100 transits to the normal mode. In another embodiment, load condition detecting circuit 124 is configured to provide mode control signal FLAG via comparing a switching period of switch mode power supply 100 with a period reference. When the switching period of switch mode power supply 100 is larger than the period reference, switch mode power supply 100 is recognized as working at light load, mode control signal FLAG becomes effective to increase on-time period ton1 of the first switch. When the switching period of switch mode power supply 100 is less than the period reference, switch mode power supply 100 is recognized as working at non-light load, mode control signal FLAG becomes ineffective to decrease on-time period ton1 of the first switch.

Logic circuit 123 is coupled to the output terminal of comparison circuit 121 and the output terminal of on-time control circuit 122, and is configured to provide control signal CTRL to turn ON and/or turn OFF the first switch based on on-time control signal TON and setting signal SET.

Feedback circuit 13 is configured to provide feedback signal VFB via testing output voltage VO of switch mode power supply 100. One with ordinary skill in the art should appreciate that feedback circuit 13 may comprise resistor divider, capacitor divider, or any other suitable circuit.

Figure 2:
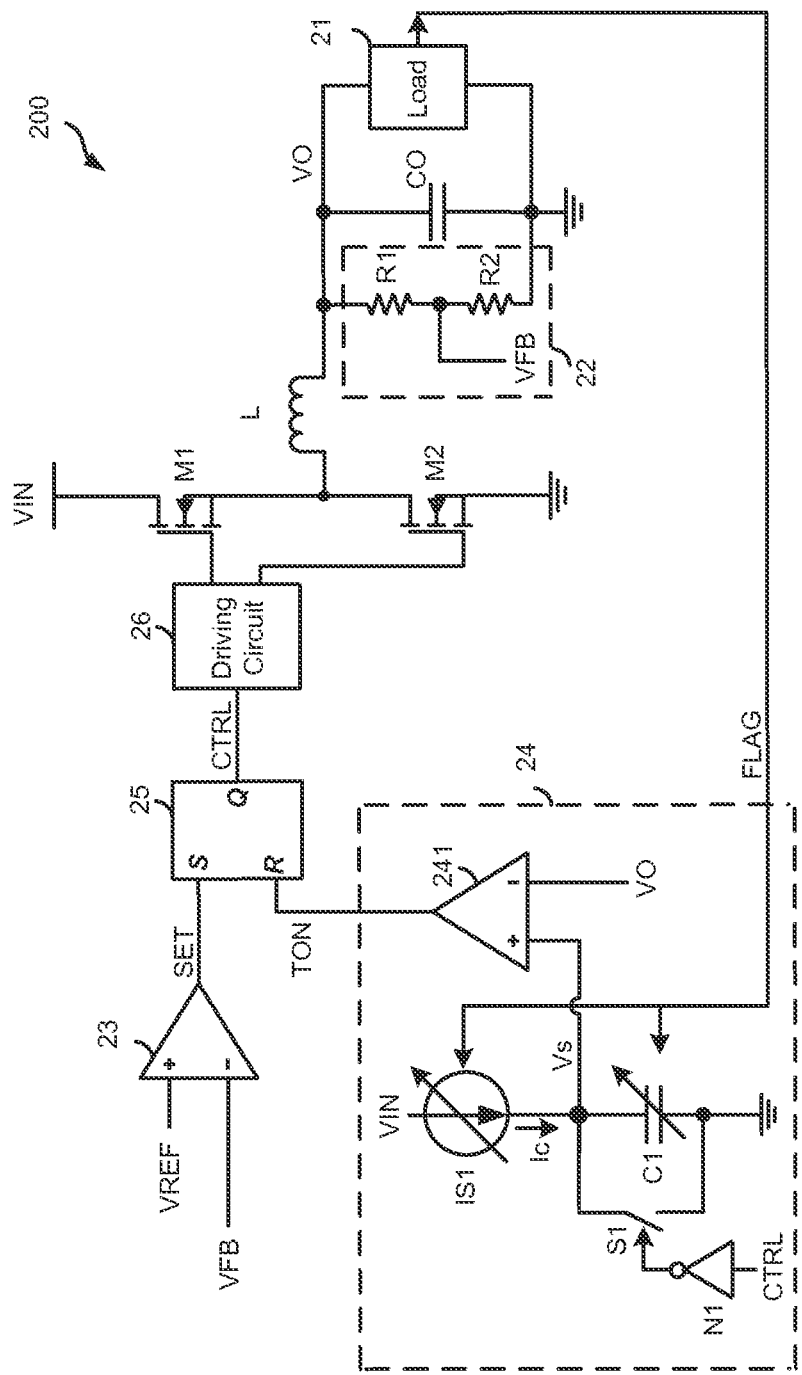
FIG. 2 schematically illustrates a circuit diagram of a switch mode power supply 200 according to an embodiment of the present invention.

FIG. 2 schematically illustrates a circuit diagram of a switch mode power supply 200 according to an embodiment of the present invention. Switch mode power supply 200 employs step-down converter as one example. Switch mode power supply 200 comprises a switch M1, a switch M2, an inductor L and a capacitor CO. Switch mode power supply 200 is configured to convert input voltage VIN to output voltage VO via turning ON and/or turning OFF switch M1 and switch M2. One terminal of switch M1 is coupled to input voltage VIN, the other terminal of switch M1 is coupled to one terminal of switch M2, and the other terminal of switch M2 is coupled to the system ground. One terminal of inductor L is coupled to a common node of switch M1 and switch M2, capacitor CO is coupled between the other terminal of inductor L and the system ground. A voltage across capacitor CO is output voltage VO. One of ordinary skill in the art should appreciate that switch mode power supply 200 may adopt any suitable direct to direct (DC/DC) topologies or alternating to direct (AC/DC) topologies, such as step-up converter, step-down converter, flyback converter and forward converter. Switch M1 and switch M2 may be any suitable controllable semiconductor switching device, such as Metal-Oxide-Semiconductor Field Effect Transistor (MOSFET), Insulated Gate Bipolar Translator (IGBT) and so on.

Continuing with FIG. 2, a load 21 is coupled to capacitor CO in parallel. In the embodiment shown in FIG. 2, load 21 is configured to provide mode control signal FLAG. Load 21 may be a smart unit such as Central Processing Unit (CPU), Micro programmed Control Unit (MCU) and so on. When in AOAC mode or standby mode, Load 21 is configured to provide effective mode control signal FLAG, and switch mode power supply 200 is configured to transit to the power saving mode.

Switch mode power supply 200 further comprises a feedback circuit 22, a comparison circuit 23, an on-time control circuit 24 and a flip-flop 25.

As shown in FIG. 2, feedback circuit 22 is a voltage divider comprising a resistor R1 and a resistor R2, wherein one terminal of resistor R1 is coupled to one terminal of capacitor CO, i.e., an output terminal of switch mode power supply 200, the other terminal of resistor R1 is coupled to one terminal of resistor R2, and the other terminal of resistor R2 is coupled to the other terminal of capacitor CO, i.e., the system ground, a common node of resistor R1 and resistor R2 is configured to provide feedback signal VFB. Comparison circuit 23 comprises a non-inverting terminal, an inverting terminal and an output terminal, wherein the non-inverting terminal is configured to receive reference voltage VREF, the inverting terminal is configured to receive feedback signal VFB, and the output terminal is configured to provide setting signal SET via comparing feedback signal VFB with reference voltage VREF. Reference voltage VREF may be constant or variable. In one embodiment, reference voltage VREF is provided through a digital to analog device (DAC). In one embodiment, the non-inverting terminal of comparator 23 may be coupled to reference voltage VREF and a compensation signal. In another embodiment, the inverting terminal of comparator 23 may be coupled to feedback signal VFB and the compensation signal.

On-time control circuit 24 is configured to receive input voltage VIN, output voltage VO, mode control signal FLAG and switching control signal CTRL, and is configured to provide on-time control signal TON. In the embodiment shown in FIG. 2, on-time control circuit 24 comprises a current source IS1, a capacitor C1, a control switch S1 and a comparison circuit 241.

Current source IS1 comprises a first terminal and a second terminal, wherein the first terminal of current source IS1 is configured to receive input voltage VIN, the second terminal of current source IS1 is coupled to one terminal of capacitor C1 to provide a charging current Ic, and the other terminal of capacitor C1 is coupled to the system ground. Current source IS1 is configured to charge capacitor C1 by charging current Ic. In one embodiment, charging current Ic varies with input voltage VIN, e.g., increases with increasing of input voltage VIN. In one embodiment, charging current Ic is further related with mode control signal FLAG. When mode control signal FLAG is effective, e.g., FLAG="1", switch mode power supply 200 works in the power saving mode to extend on-time period ton1 of switch M1 by decreasing charging current Ic. For example, charging current Ic is 10 uA when mode control signal FLAG is effective, and charging current Ic is 25 uA when mode control signal FLAG is ineffective. In one embodiment, current source IS1 comprises a resistor and a current mirror coupled in serial, wherein one terminal of the resistor is configured to receive input voltage VIN, the other terminal of the resistor is coupled to an input terminal of the current mirror, and an output terminal of the current mirror is configured to provide charging current Ic to capacitor C1. When mode control signal FLAG is effective, e.g., FLAG="1", switch mode power supply 200 works in the power saving mode, increasing resistance of the resistor and/or decreasing a ratio between output current and input current of the current mirror to decrease charging current Ic, and as a result, on-time period ton1 of switch M1 extends.

Control switch S1 comprises a first terminal, a second terminal and a control terminal, wherein the first terminal of control switch S1 is coupled to one terminal of capacitor C1, the second terminal of control switch S1 is coupled to the other terminal of capacitor C1, and the control terminal of control switch S1 is configured to receive switching control signal CTRL through an NOT gate N1. In one embodiment, when switching control signal CTRL is effective, e.g., high voltage level, control switch S1 is turned OFF, capacitor C1 is charged by current source IS1, and the voltage across capacitor C1 increases gradually; when switching control signal CTRL is ineffective, e.g., low voltage level, control switch S1 is turned ON, capacitor C1 is discharged via control switch S1, the voltage across capacitor C1 decreases. In one embodiment, a voltage Vs at a common node of capacitor C1 and current source IS1 represents the voltage across capacitor C1. In one embodiment, when mode control signal FLAG is effective, e.g., FLAG="1", switch mode power supply 200 works in the power saving mode, on-time period ton1 of switch M1 extends via increasing capacitance of capacitor C1. For example, a switch may be employed to switch different capacitance of capacitor at different mode, i.e., at the power saving mode or at the normal mode. In one example, when mode control signal FLAG is effective, capacitance of capacitor C1 is 20 pF, and when mode control signal FLAG is ineffective, capacitance of capacitor is 8 pF.

Comparison circuit 241 comprises a non-inverting terminal, an inverting terminal and an output terminal, wherein the non-inverting terminal of comparison circuit 241 is configured to receive voltage Vs, the inverting terminal of comparison circuit 241 is configured to receive output voltage VO, and the output terminal of comparison circuit 241 is configured to provide on-time control signal TON via comparing voltage Vs with output voltage VO.

Flip-flop 25 comprises a reset terminal R, a set terminal S and an output terminal Q, wherein reset terminal R of flip-flop 25 is coupled to the output terminal of on-time control circuit 24 to receive on-time control signal TON, set terminal S of flip-flop 25 is coupled to the output terminal of comparison circuit 23 to receive setting signal SET, and output terminal Q of flip-flop 25 is configured to provide switching control signal CTRL. Switching control signal CTRL is configured to turn ON and/or turn OFF switch M1 and switch M2 through driving circuit 26. In one embodiment, when voltage Vs is less than output voltage VO, on-time control signal TON is ineffective, e.g., low voltage level, output of flip-flop 25 maintains; and when voltage Vs is larger than output voltage VO, on-time control signal TON is effective, e.g., high voltage level, to reset flip-flop 25, switching control signal CTRL is ineffective, e.g., CTRL="0", to turn OFF switch M1.

In one embodiment, when mode control signal FLAG is effective, e.g., FLAG="1", decreasing charging current Ic provided by current source IS1, and/or increasing capacitance of capacitor C1 to extend on-time period ton1 of switch M1.

Figure 3:
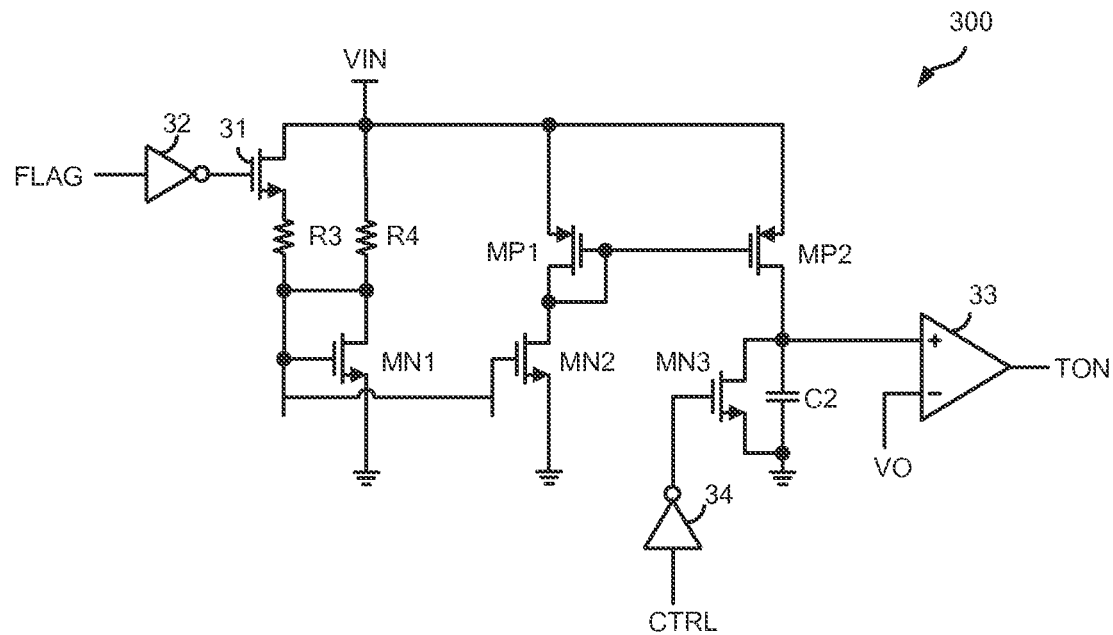
FIG. 3 schematically illustrates an on-time control circuit 300 according to an embodiment of the present invention.

FIG. 3 schematically illustrates an on-time control circuit 300 according to an embodiment of the present invention.

On-time control circuit 300 comprises a switch 31, a switch MP1, a switch MP2, a switch MN1, a switch MN2, a switch MN3, a resistor R3, a resistor R4, a capacitor C2, a comparator 33, a NOT gate 32 and a NOT gate 34. One terminal of resistor R4 is coupled to input voltage VIN, the other terminal of resistor R4 is coupled to drain of switch MN1 and gate of switch MN1 and gate of switch MN2. Drain of switch 31 is coupled to input voltage VIN, source of switch 31 is coupled to one terminal of resistor R3, the other terminal of resistor R3 is coupled to drain of switch MN1, gate of switch MN1 and gate of switch MN2. Source of switch MN1 and source of switch MN2 are coupled to the system ground. Source of switch MP1 and source of switch MP2 are coupled to input voltage VIN, gate of switch MP1 and gate of switch MP2 are coupled to drain of switch MP1. Drain of switch MP1 is coupled to drain of switch MN2. Drain of switch MP2 is coupled to drain of switch MN3 and one terminal of capacitor C2, source of switch MN3 is coupled to the system ground and the other terminal of capacitor C2. Capacitor C2 is coupled in parallel with switch MN3. NOT gate 34 comprises an input terminal configured to receive switching control signal CTRL, and an output terminal coupled to gate of switch MN3. Comparator 33 comprises a non-inverting terminal coupled to drain of switch MN3, an inverting terminal coupled to output voltage VO, and an output terminal configured to provide Switch MN1 and switch MN2 are employed as a first current mirror, and switch MP1 and switch MP2 are employed as a second current mirror. In one embodiment, width to length ratio of switch MN1 and switch MN2 is about 1:n, and width to length ratio of switch MP1 and switch MP2 is about 1:m, where n and m are positive constant value. As a result, when switch 31 is turned on, current flowing through switch MN1 is about VIN*(R4+R3)/(R4*R3) and current flowing through switch MP2 is about n*m*VIN(R4+R3)/(R4*R3); and when switch 31 is turned OFF, current flowing through switch MN1 is about VIN/R4 and current flowing through switch MP2 is about n*m*VIN/R4.

In one embodiment, when mode control signal FLAG is effective, switch 31 is turned OFF through NOT gate 32, current flowing through switch MN1 decreases. As shown in FIG. 3, gate of switch 31 is coupled to mode control signal FLAG through NOT gate 32. When mode control signal FLAG="1", switch mode power supply works in the power saving mode, switch 31 is turned OFF, current flowing through switch MN1 is determined by resistance of resistor R4 and input voltage VIN; and when mode control signal FLAG="0", switch mode power supply works in the normal mode, switch 31 is turned on, current flowing through switch MN1 is determined by resistance of resistor R3, resistance of resistor R4 and input voltage VIN. In the embodiment shown in FIG. 3, resistor R3 and resistor R4 is coupled in serial. In another embodiment, resistor R3 and resistor R4 may be coupled in parallel.

Figure 4:
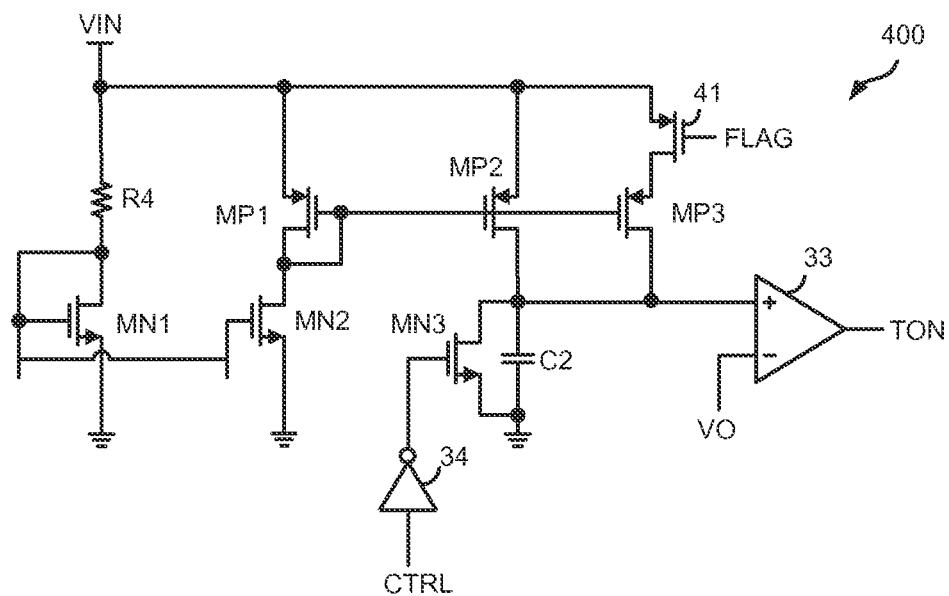
FIG. 4 schematically illustrates an on-time control circuit 400 according to another embodiment of the present invention.

FIG. 4 schematically illustrates an on-time control circuit 400 according to another embodiment of the present invention. Similar to on-time control circuit 300, on-time control circuit 400 comprises switch MP1, switch MP2, switch MN1, switch MN2, switch MN3, resistor R4, capacitor C2, comparator 33 and NOT gate 34. On-time control circuit 400 further comprises a switch 41 and a switch MP3. Source of switch 41 is coupled to input voltage VIN, gate of switch 41 is configured to receive mode control signal FLAG, and drain of switch 41 is coupled to source of switch MP3. Gate of switch MP3 is coupled to gate of switch MP1, gate of switch MP2 and drain of switch MN2. Drain of switch MP3 is coupled to drain of switch MN3, capacitor C2 and the non-inverting terminal of comparator 33.

Switch MN1 and switch MN2 are employed as a third current mirror, and switch MP1, switch MP2 and switch MP3 are employed as a fourth current mirror. In one embodiment, width to length ratio of switch MN1 and switch MN2 is about 1:n, width to length ratio of switch MP1 and switch MP2 is about 1:m, and width to length ratio of switch MP1 and switch MP3 is about 1:z, where n, m and z are positive constant value. Current flowing through switch MN1 is about VIN/R4, current flowing through switch MP2 is about n*m*VIN/R4, and when switch 41 is turned on, current flowing through switch MP3 is about n*z*VIN/R4. In the embodiment shown in FIG. 4, when mode control signal FLAG="1", switch mode power supply works in the power saving mode, switch 41 is turned OFF, charging current of capacitor C2 is about n*m*VIN/R4; and when mode control signal FLAG="0", switch mode power supply works in the normal mode, switch 41 is turned on, charging current of capacitor C2 is about n*(m+z)*VIN/R4.

Figure 5:
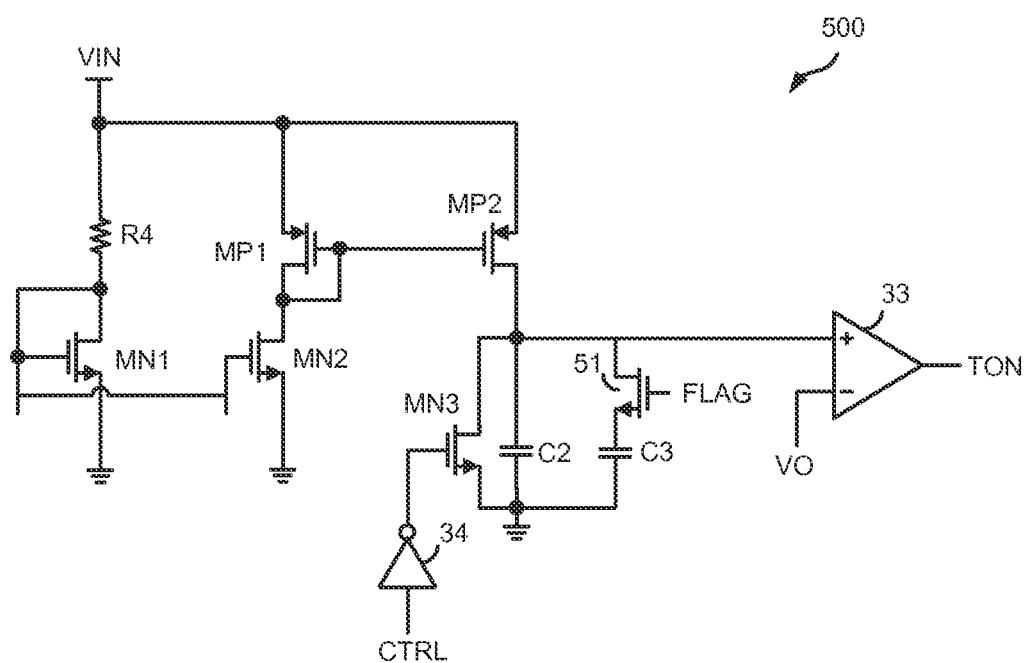
FIG. 5 schematically illustrates an on-time control circuit 500 according to another embodiment of the present invention.

FIG. 5 schematically illustrates an on-time control circuit 500 according to another embodiment of the present invention. Similar to on-time control circuit 300, on-time control circuit 500 comprises switch MP1, switch MP2, switch MN1, switch MN2, switch MN3, resistor R4, capacitor C2, comparator 33 and NOT gate 34. On-time control circuit 500 further comprises a switch 51 and a capacitor C3. Drain of switch 51 is coupled to drain of switch MN3, capacitor C2 and the non-inverting terminal of comparator 33, gate of switch 51 is configured to receive mode control signal FLAG, source of switch 51 is coupled to one terminal of capacitor C3, the other terminal of capacitor C3 is coupled to the system ground. When mode control signal FLAG is effective, switch 51 is turned on, capacitor C2 and capacitor C3 are charged by current flowing through switch MP2. When mode control signal FLAG is ineffective, switch 51 is turned OFF, capacitor C2 is charged by current flowing through switch MP2.

Figure 6:
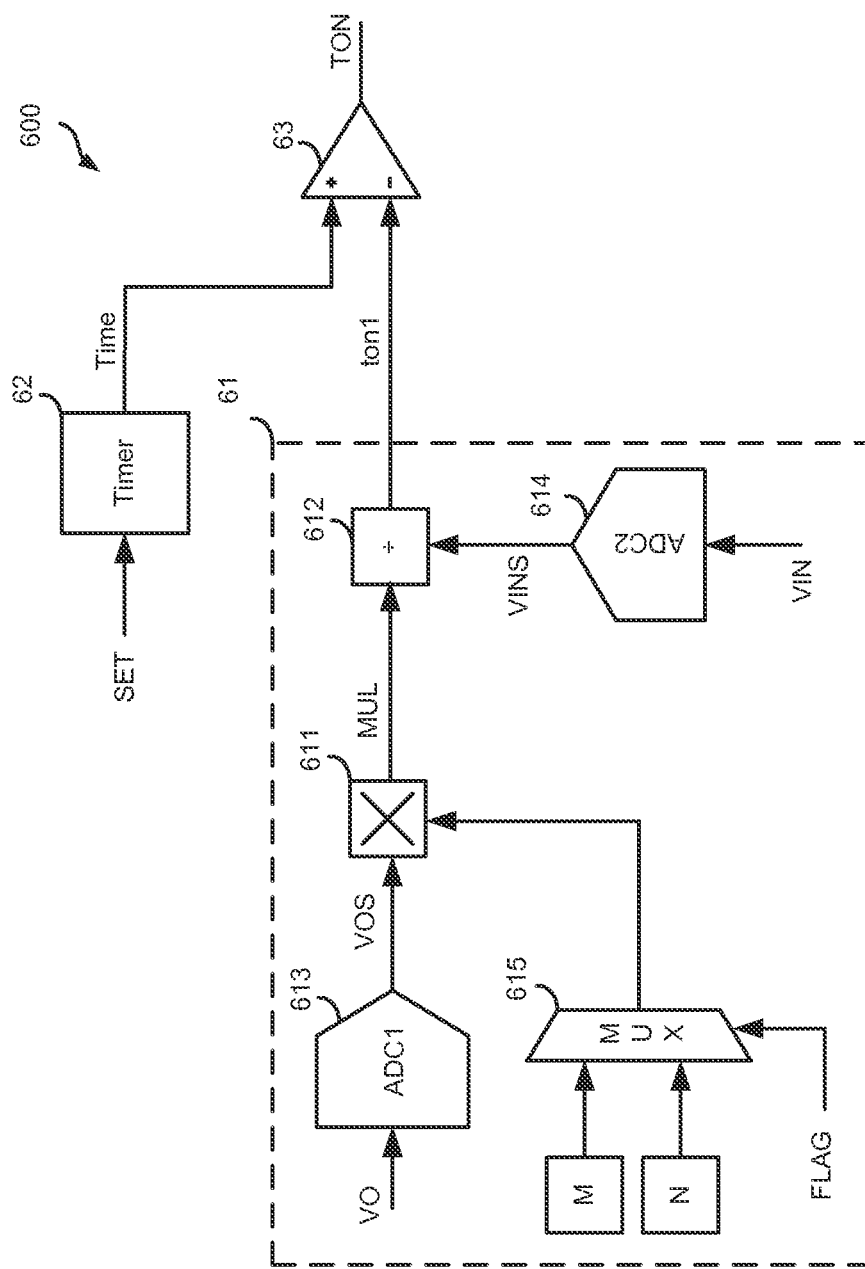
FIG. 6 schematically illustrates an on-time control circuit 600 according to another embodiment of the present invention.

FIG. 6 schematically illustrates an on-time control circuit 600 according to another embodiment of the present invention. On-time control circuit 600 comprises an on-time generating circuit 61, a timer 62 and a comparator 63.

On-time generating circuit 61 is configured to provide an expected on-time period ton1 based on input voltage VIN, output voltage VO and mode control signal FLAG. On-time generating circuit 61 comprises a multiplying circuit 611, a dividing circuit 612, an analog to digital converter (ADC) 613, an ADC 614, and a multiplexer 615. ADC 613 comprises an input terminal coupled to output voltage VO, and an output terminal configured to provide digital sampling signal VOS. Multiplexer 615 comprises a first input terminal, a second input terminal, a control terminal and an output terminal, wherein the first input terminal is configured to receive constant value M, the second input terminal is configured to receive constant value N, the control terminal is configured to receive mode control signal FLAG, and the output terminal is configured to output constant value M or constant value N based on mode control signal FLAG. In one embodiment, when mode control signal FLAG is effective, e.g., FLAG="1", switch mode power supply works in the power saving mode, multiplexer 615 is configured to output constant value M. When mode control signal FLAG is ineffective, e.g., FLAG="0", switch mode power supply works in the normal mode, multiplexer 615 is configured to output constant value N. In one embodiment, constant value M is larger than constant value N. Multiplying circuit 611 comprises a first input terminal, a second input terminal and an output terminal, wherein the first input terminal of multiplying circuit 611 is coupled to the output terminal of ADC 613 to receive digital sampling signal VOS, the second input terminal of multiplying circuit 611 is coupled to the output terminal of multiplexer 615 to receive constant value M or constant value N, and the output terminal is configured to provide a product signal MUL. ADC 614 comprises an input terminal coupled to input voltage VIN, and an output terminal configured to provide a digital sampling signal VINS. Dividing circuit 612 comprises a first input terminal, a second input terminal and an output terminal, wherein the first input terminal of dividing circuit 612 is coupled to the output terminal of multiplying circuit 611 to receive product signal MUL, the second input terminal of dividing circuit 612 is coupled to the output terminal of ADC 614 to receive digital sampling signal VINS, and the output terminal of dividing circuit 612 is configured to provide expected on-time period ton1. In one embodiment, when mode control signal CTRL is effective, switch mode power supply works in the power saving mode, expected on-time period ton1 is:

$$ton1=M*VO/VIN \qquad (4)$$

When mode control signal CTRL is ineffective, switch mode power supply works in the normal mode, expected on-time period ton1 is:

$$ton1=N*VO/VIN \qquad (5)$$

Where M>N. As a result, expected on-time period ton1 at the power saving mode extends. In one embodiment, the second signal N may represent a switching period of switch mode power supply at the normal mode.

In one embodiment, on-time generating circuit 61 may receive an input sampling signal VIN_sense representing input voltage VIN, and/or an output sampling signal VO_sense representing output voltage VO, e.g., feedback signal VFB, and provide expected on-time period ton1. In one embodiment, when mode control signal FLAG is effective, expected on-time period ton1 is:

$$ton1=Y*M*VO\_sense/VIN\_sense \qquad (6)$$

When mode control signal FLAG is ineffective, expected on-time period ton1 is:

$$ton1=Y*N*VO\_sense/VIN\_sense \qquad (7)$$

Where signal Y is related with a ratio between input voltage VIN and input sampling signal VIN_sense (VIN/VIN_sense) and/or a ratio between output voltage VO and output sampling signal VO_sense (VO/VO_sense). In one embodiment, signal Y is:

$$Y=VIN\_sense*VO/(VIN*VO\_sense) \qquad (8)$$

Timer 62 comprises an input terminal configured to receive a setting signal SET, and an output terminal configured to provide a timing signal Time. When setting signal SET is effective, timer 62 starts timing from zero. In one embodiment, when feedback signal VFB is less than reference voltage VREF, setting signal SET is effective, e.g., SET="1", and when feedback signal VFB is larger than reference voltage VREF, setting signal SET is ineffective, e.g., SET="0". Comparator 63 comprises a non-inverting terminal, an inverting terminal and an output terminal, wherein the non-inverting terminal of comparator 63 is coupled to the output terminal of timer 62 to receive timing signal Time, the inverting terminal of comparator 63 is coupled to the output terminal of dividing circuit 612 to receive expected on-time period ton1 and the output terminal of comparator 63 is configured to provide on-time control signal TON. When timing signal Time increases to expected on-time period ton1, on-time control signal TON is effective, e.g., TON="1", to turn OFF switch M1 of switch mode power supply 200.

On-time control circuit 600 may be implemented by digital circuit such as FPGA (Field Programmable Gate Array), ASIC (Application Specific Integrated Circuit), PLO (Programmable Logic Device), DSP (Digital Signal Processor) and MCU (Micro programmed Control Unit).

Figure 7:
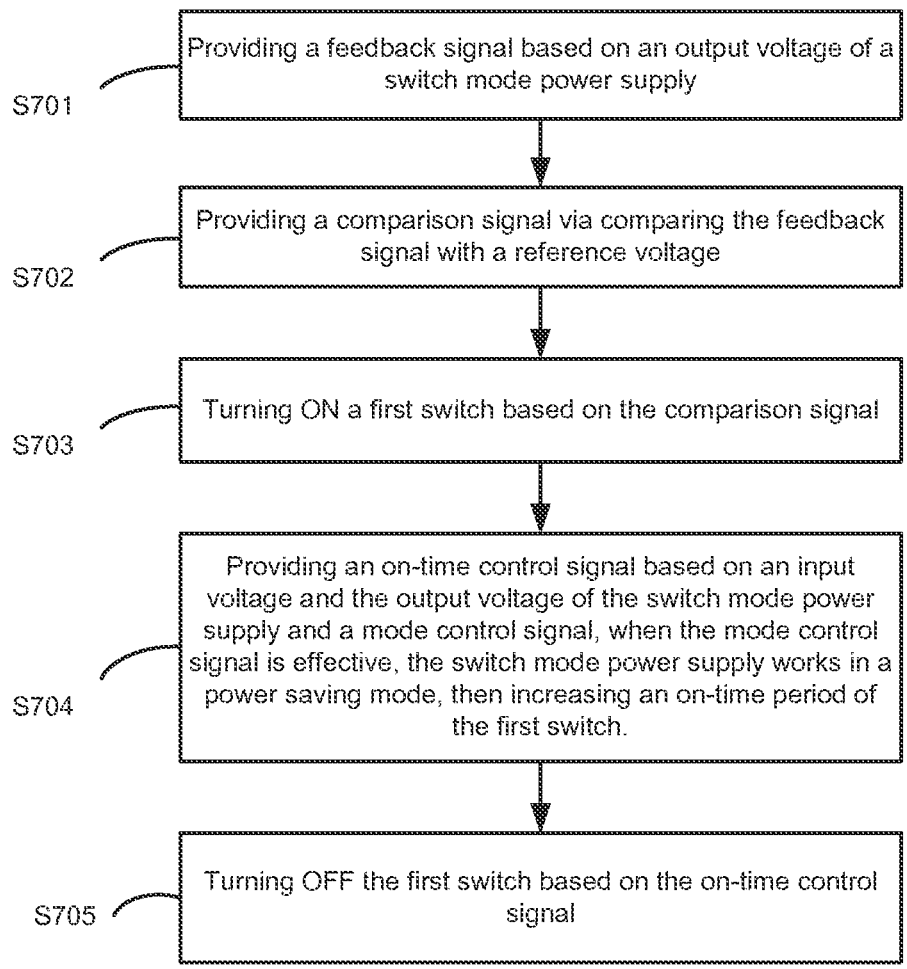
FIG. 7 shows a flow chart illustrating a control method with reference to a switch mode power supply according to an embodiment of the present invention.

FIG. 7 shows a flow chart illustrating a control method with reference to a switch mode power supply according to an embodiment of the present invention. The switch mode power supply comprises a first switch and a control circuit configured to turn ON and turn OFF the first switch. The control method comprises steps S701-S705.

In step S701, providing a feedback signal based on an output voltage of the switch mode power supply.

In step S702, providing a comparison signal via comparing the feedback signal with a reference voltage.

In step S703, turning ON the first switch based on the comparison signal.

In step S704, providing an on-time control signal based on an input voltage of the switch mode power supply, the output voltage of the switch mode power supply, and a mode control signal. When the mode control signal is effective, the switch mode power supply works in a power saving mode and on-time period of the first switch extends.

In step S705, turning OFF the first switch based on the on-time control signal.

In one embodiment, when the mode control signal is effective, the switch mode power supply transits to the power saving mode, and the on-time period of the first switch is proportional to a first value. When the mode control signal is ineffective, the switch mode power supply transits to a normal mode, and the on-time period of the first switch is proportional to a second value. The first value is larger than the second value, and the on-time period of the first switch under the power saving mode is larger than that under the normal mode, as a result, efficiency at the power saving mode is improved, while fast load transient response at the normal mode is achieved.

In one embodiment, the mode control signal is provided by a load, e.g., CPU of an ultrabook. In another embodiment, the mode control signal is provided by the switch mode power supply itself, e.g., providing the mode control signal based on an output current or a switching period of the switch mode power supply. In one embodiment, when the output current is less than a reference current, the mode control signal becomes effective, and when the output current is larger than the reference current, the mode control signal becomes ineffective. In one embodiment, when the switching period of the switch mode power supply is larger than a reference period, the mode control signal becomes effective, and when the switching period of the switch mode power supply is less than the reference period, the mode control signal becomes ineffective.

Note that in the flow chart described above, the box functions may also be implemented with different order as shown in FIG. 8. For example, two successive box functions may be executed meanwhile, or sometimes the box functions may be executed in a reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A control circuit to control a switch mode power supply, the switch mode power supply having a first switch with a control terminal, an input terminal configured to receive an input voltage and an output terminal configured to provide an output voltage, wherein the control circuit comprising:
a first comparison circuit, having a first input terminal, a second input terminal and an output terminal, wherein the first input terminal of the first comparison circuit is configured to receive a feedback signal indicating the output voltage, the second input terminal of the first comparison circuit is configured to receive a reference voltage, and the output terminal of the first comparison circuit is configured to provide a setting signal;
an on-time control circuit, configured to receive the input voltage, the output voltage and a mode control signal and provide an on-time control signal based on the input voltage, the output voltage and the mode control signal, wherein the on-time control signal is configured to control an on-time period of the first switch; and
a logic circuit, having a first input terminal, a second input terminal and an output terminal, wherein the first input terminal of the logic circuit is configured to receive the setting signal, the second input terminal of the logic circuit is configured to receive the on-time control signal, and the output terminal of the logic circuit is configured to provide a switching control signal to the control terminal of the first switch; and wherein
when the mode control signal is in a first state, the switch mode power supply is configured to work in a power saving mode, the on-time period of the first switch is proportional to a first constant value to decrease a switching frequency of the first switch to improve efficiency; and
when the mode control signal is in a second state, the switch mode power supply is configured to work in a normal mode, the on-time period of the first switch is proportional to a second constant value to increase the switching frequency of the first switch to improve load transient performance, wherein the first constant value is larger than the second constant value.

2. The control circuit of claim 1, wherein the on-time control circuit comprising:
a current source having a first terminal and a second terminal, wherein the first terminal of the current source is configured to receive the input voltage of the switch mode power supply, the second terminal of the current source is configured to provide a charging current, wherein the charging current is proportional to the input voltage of the switch mode power supply;
a first capacitor having a first terminal and a second terminal, wherein the first terminal of the first capacitor is coupled to the second terminal of the current source, and the second terminal of the first capacitor is coupled to a system ground;
a first controlling switch having a control terminal, wherein the first controlling switch is coupled to the first capacitor in parallel, and the control terminal of the first controlling switch is configured to receive the switching control signal; and
a comparator, having a first input terminal, a second input terminal and an output terminal, wherein the first input terminal of the comparator is coupled to the first terminal of the first capacitor, the second input terminal of the comparator is configured to receive the output voltage of the switch mode power supply, and the output terminal of the comparator is configured to provide the on-time control signal.

3. The control circuit of claim 2, wherein when the mode control signal is in the first state, the charging current is configured to decrease.

4. The control circuit of claim 2, wherein when the mode control signal is in the first state, a capacitance of the first capacitor is configured to increase.

5. The control circuit of claim 2, wherein the current source comprising:
- a first resistor having a first terminal and a second terminal, wherein the first terminal of the first resistor is coupled to the input voltage of the switch mode power supply;
- a second controlling switch, having a first terminal, a second terminal and an output terminal, wherein the first terminal of the second controlling switch is coupled to the first terminal of the first resistor, the control terminal of the second controlling switch is configured to receive the mode control signal;
- a second resistor having a first terminal and a second terminal, wherein the first terminal of the second resistor is coupled to the second terminal of the second controlling switch, and the second terminal of the second resistor is coupled to the second terminal of the first resistor; and
- a current mirror having an input terminal and an output terminal, wherein the input terminal of the current mirror is coupled to the second terminal of the first resistor and the second terminal of the second resistor to receive an input current, and the output terminal of the current mirror is configured to provide the charging current.

6. The control circuit of claim 2, wherein the current source comprising:
- a first resistor, having a first terminal and a second terminal, wherein the first terminal of the first resistor is coupled to the input voltage of the switch mode power supply; and
- a current mirror, having an input terminal and an output terminal, wherein the input terminal of the current mirror is coupled to the second terminal of the first resistor to receive an input current, and the output terminal of the current mirror is configured to provide the charging current; and wherein
- when the mode control signal is in the first state, a ratio between the charging current and the input current is configured to decrease.

7. The control circuit of claim 2, wherein the on-time control circuit further comprising:
- a second controlling switch, having a first terminal, a second terminal and a control terminal, wherein the first terminal of the second controlling switch is coupled to the first terminal of the first capacitor and the second terminal of the current source, and the control terminal of the second controlling switch is configured to receive the mode control signal; and
- a second capacitor having a first terminal and a second terminal, wherein the first terminal of the second capacitor is coupled to the second terminal of the second controlling switch, and the second terminal of the second capacitor is coupled to the system ground.

8. The control circuit of claim 1, when the switch mode power supply is recognized as working at light load, the mode control signal transits to the first state, and when the switch mode power supply is recognized as working at non-light load, the mode control signal transits to the second state.

9. The control circuit of claim 1, wherein the on-time control circuit comprising:
- an on-time generating circuit, having a first input terminal, a second input terminal, a third input terminal and an output terminal, wherein the first input terminal of the on-time generating circuit is coupled to the input voltage, the second input terminal of the on-time generating circuit is coupled to the output voltage, the third input terminal of the on-time generating circuit is coupled to the mode control signal, and the output terminal of the on-time generating circuit is configured to provide an on-time signal representing an expected on-time period of the first switch;
- a timing circuit, having an input terminal and an output terminal, wherein the input terminal of the timing circuit is coupled to the output terminal of the first comparison circuit to receive the setting signal, when the setting signal indicates that the feedback signal is less than the reference voltage, the timing circuit starts timing, and the output terminal of the timing circuit is configured to provide a timing signal representing a time interval timing from when the feedback signal being less than the reference voltage; and
- a second comparison circuit, having a first input terminal, a second input terminal and an output terminal, wherein the first input terminal of the second comparison circuit is coupled to the output terminal of the timing circuit, the second input terminal of the second comparison circuit is coupled to the output terminal of the on-time generating circuit, and the output terminal of the second comparison circuit is configured to provide the on-time control signal.

10. A switch mode power supply, having an input terminal coupled to an input voltage and an output terminal configured to provide an output voltage, wherein the switch mode power supply comprising:
- a first switch, having a first terminal, a second terminal and a control terminal, wherein the first terminal of the first switch is coupled to the input terminal of the switch mode power supply; and
- a control circuit, configured to provide a switching control signal to the control terminal of the first switch, wherein the first switch is turned ON and OFF by the switching control signal to regulate the output voltage; and wherein
- the control circuit is configured to provide the switching control signal with a longer on-time period of the first switch when the switch mode power supply works in a power saving mode, and the control circuit is configured to provide the switching control signal with a shorter on-time period of the first switch when the switch mode power supply works in a normal mode; wherein
- when the switch mode power supply works in the power saving mode, the longer on-time period of the first switch is proportional to a first constant value to decrease a switching frequency of the first switch to improve efficiency; and
- when the switch mode power supply works in the normal mode, the shorter on-time period of the first switch is proportional to a second constant value to increase the switching frequency of the first switch to improve load transient performance, and the second constant value is less than the first constant value.

11. The switch mode power supply of claim 10, wherein the switch mode power supply further comprising:
- a second switch, having a first terminal, a second terminal and a control terminal, wherein the first terminal of the second switch is coupled to the second terminal of the first switch, the second terminal of the second switch is coupled to a system ground, and the control terminal of the second switch is coupled to the output terminal of the control circuit;

an inductor, having a first terminal and a second terminal, wherein the first terminal of the inductor is coupled to the second terminal of the first switch and the first terminal of the second switch; and a first capacitor having a first terminal and a second terminal, wherein the first terminal of the first capacitor is coupled to the second terminal of the inductor, and the second terminal of the first capacitor is coupled to the system ground.

12. The switch mode power supply of claim 10, wherein the control circuit comprising:

a first comparison circuit, having a first input terminal, a second input terminal and an output terminal, wherein the first input terminal of the first comparison circuit is configured to receive a feedback signal indicating the output voltage, the second input terminal of the first comparison circuit is configured to receive a reference voltage, and the output terminal of the first comparison circuit is configured to provide a setting signal;

an on-time control circuit, configured to receive a mode control signal and provide an on-time control signal, wherein the on-time control signal is configured to control an on-time period of the first switch; and a logic circuit, having a first input terminal, a second input terminal and an output terminal, wherein the first input terminal of the logic circuit is configured to receive the setting signal, the second input terminal of the logic circuit is configured to receive the on-time control signal, and the output terminal of the logic circuit is configured to provide a switching control signal to the control terminal of the first switch; and wherein when the mode control signal is in a first state, the switch mode power supply is configured to work in the power saving mode, and when the mode control signal is in a second state, the switch mode power supply is configured to work in the normal mode.

13. The switch mode power supply of claim 12, wherein when the mode control signal is in the first state, the on-time period of the first switch is proportional to the first constant value, and when the mode control signal is in the second state, the on-time period of the second switch is proportional to the second constant value.

14. The switch mode power supply of claim 12, wherein the on-time control circuit comprising:

a current source, having a first terminal and a second terminal, wherein the first terminal of the current source is configured to receive the input voltage of the switch mode power supply, the second terminal of the current source is configured to provide a charging current, wherein the charging current is proportional to the input voltage of the switch mode power supply;

a second capacitor, having a first terminal and a second terminal, wherein the first terminal of the second capacitor is coupled to the second terminal of the current source, and the second terminal of the second capacitor is coupled to a system ground;

a first controlling switch, having a first terminal, a second terminal and an output terminal, wherein the first terminal of the first controlling switch is coupled to the first terminal of the second capacitor, the second terminal of the first controlling switch is coupled to the second terminal of the second capacitor, and the control terminal of the first controlling switch is configured to receive the switching control signal; and a comparator, having a first input terminal, a second input terminal and an output terminal, wherein the first input terminal of the comparator is coupled to the first terminal of the second capacitor, the second input terminal of the comparator is configured to receive the output voltage of the switch mode power supply, and the output terminal of the comparator is configured to provide the on-time control signal; and wherein when the mode control signal is in the first state, the charging current is configured to decrease.

15. The switch mode power supply of claim 12, wherein the on-time control circuit comprising:

a current source, configured to provide a charging current, wherein the charging current is proportional to the input voltage of the switch mode power supply;

a second capacitor, having a first terminal and a second terminal, wherein the first terminal of the second capacitor is configured to receive the charging current, and the second terminal of the second capacitor is coupled to a system ground;

a first controlling switch, having a first terminal, a second terminal and an output terminal, wherein the first terminal of the first controlling switch is coupled to the first terminal of the second capacitor, the second terminal of the first controlling switch is coupled to the second terminal of the second capacitor, and the control terminal of the first controlling switch is configured to receive the switching control signal; and a comparator, having a first input terminal, a second input terminal and an output terminal, wherein the first input terminal of the comparator is coupled to the first terminal of the second capacitor, the second input terminal of the comparator is configured to receive the output voltage of the switch mode power supply, and the output terminal of the comparator is configured to provide the on-time control signal; and wherein when the mode control signal is in the first state, a capacitance of the second capacitor is configured to increase.

16. A control method for controlling a switch mode power supply, the switch mode power supply having an input terminal coupled to an input voltage and an output terminal configured to provide an output voltage, the switch mode power supply comprising a first switch, the control method comprising:

providing a feedback signal based on the output voltage of the switch mode power supply;

providing a setting signal via comparing the feedback signal with a reference voltage;

turning ON the first switch based on the setting signal;

providing an on-time control signal to control an on-time period of the first switch based on a mode control signal, wherein the on-time period of the first switch is proportional to a first constant value to decrease a switching frequency of the first switch to improve efficiency when the mode control signal is in a first state, the on-time period of the first switch is proportional to a second constant value to increase the switching frequency of the first switch to improve load transient performance when the mode control signal is in a second state, wherein the first constant value is larger than the second constant value; and turning OFF the first switch based on the on-time control signal; and wherein when the switch mode power supply is recognized as working at light load, the mode control signal transits to the first state, and when the switch mode power supply is recognized as working at non-light load, the mode control signal transits to the second state.

17. The control method of claim 16, further comprising providing the mode control signal via comparing an output current of the switch mode power supply with a current reference.

18. The control method of claim 16, further comprising providing the mode control signal by a smart load.

19. The control method of claim 16, wherein providing the on-time control signal to control the on-time period of the first switch further comprising:
- providing an on-time signal representative of an expected on-time period of the first switch based on the mode control signal, the input voltage and the output voltage;
- providing a time signal representative of a time interval timing from when the feedback signal being less than the reference voltage;
- providing the on-time control signal via comparing the time signal with the on-time signal, wherein the first switch is turned OFF when the time interval equals the expected on-time period of the first switch.

* * * * *